United States Patent [19]

Coronado

[11] 3,905,435
[45] Sept. 16, 1975

[54] SIGNALING SYSTEM FOR USE ON AUTOMOTIVE VEHICLES

[76] Inventor: Telesforo G. Coronado, 2451 Balboa St., Oxnard, Calif. 93030

[22] Filed: June 17, 1974

[21] Appl. No.: 480,119

[52] U.S. Cl............ 180/1 AP; 116/28 R; 180/82 R; 340/91
[51] Int. Cl.² ........................................... B60Q 1/26
[58] Field of Search .......... 180/1 AP, 82 R; 116/50, 116/28 R; 246/1 C; 340/87, 91, 95, 100; 240/8.3; 350/307

[56] References Cited
UNITED STATES PATENTS

| | | | |
|---|---|---|---|
| 1,264,038 | 4/1918 | Ethridge | 116/50 |
| 1,500,601 | 7/1924 | Brewster | 340/95 |
| 1,668,992 | 5/1928 | Wall | 116/50 |
| 2,121,685 | 6/1938 | Crocker | 116/50 X |
| 2,654,877 | 10/1953 | Sparaco | 116/50 X |

*Primary Examiner*—Kenneth H. Betts
*Assistant Examiner*—Terrance L. Siemens

[57] ABSTRACT

This invention is directed to an extendible signaling device for use on vans, campers, motor homes and similar recreational or wide automotive vehicles.

A signaling system for use on automotive vehicles comprising a signal means carried by a carriage for movement from within the boundaries of a vehicle to a position rearwardly beyond the vehicle to indicate prospective movement of the vehicle in that direction. Activation and movement of the carriage may be manual, electrical, or by fluid pressure means. The system is particularly effective in signaling rearward movement of a vehicle from a normally concealed position.

6 Claims, 6 Drawing Figures

PATENTED SEP 16 1975 3,905,435
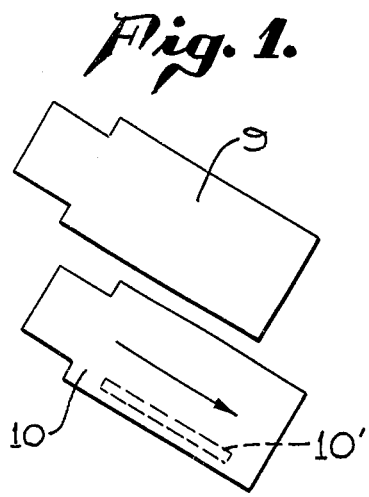
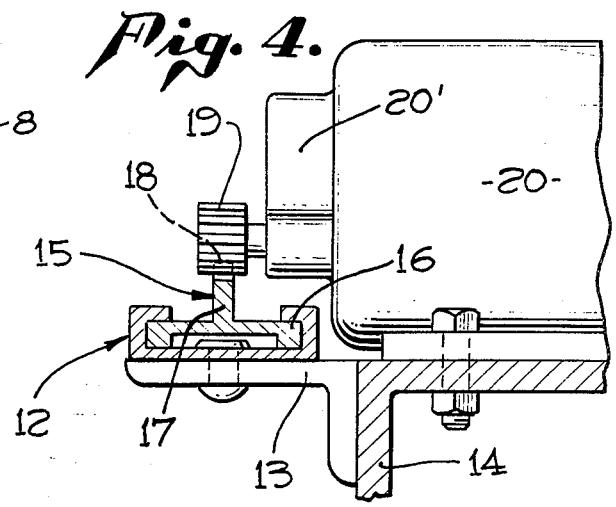
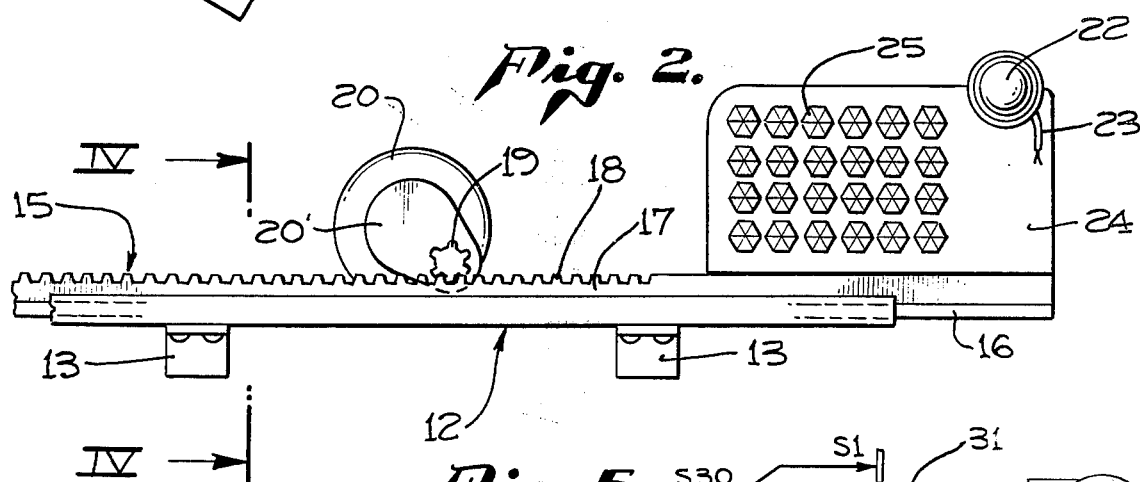
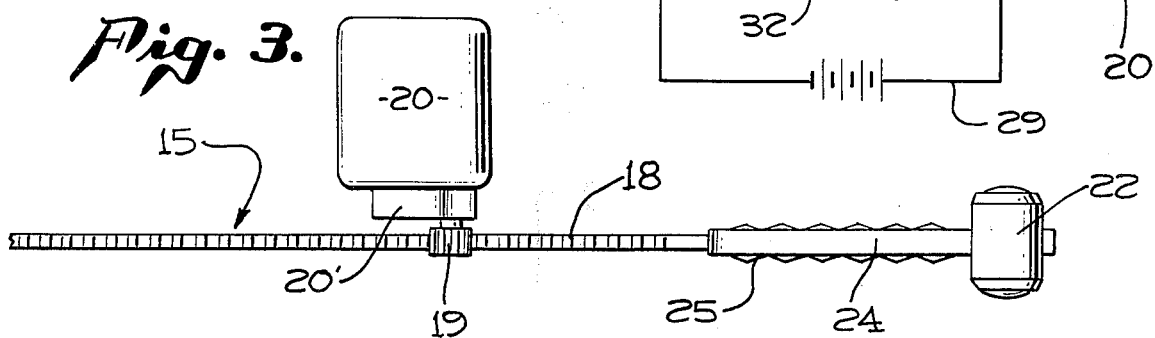
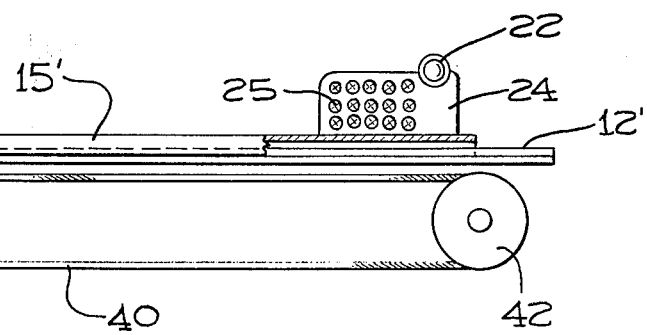
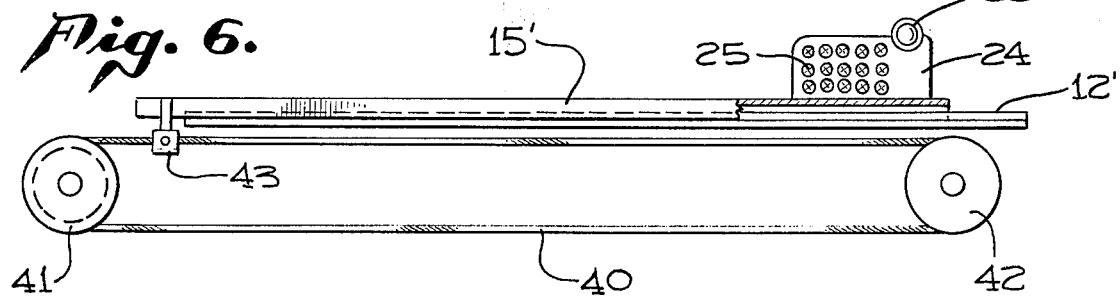

SIGNALING SYSTEM FOR USE ON AUTOMOTIVE VEHICLES

It is well known that campers, vans, motor homes and other wide and sometimes long-bodied vehicles, such as trucks, do not permit the driver to observe the approach of another vehicle from a rearward source. A classical situation occurs when a camper is parked at an angle to an inlet line and wants to back out. It is virtually impossible for the driver of the camper to see if anyone is coming toward him down the inlet lane, particularly if a van or camper is parked in the right adjacent space. The present invention is directed to the solution of this problem and provides a rearwardly extensible means which can be activated by the driver or operator before the camper begins to move rearwardly into the inlet lane, to notify incoming cars that a vehicle is backing into the inlet lane under conditions which would not convey such notification to the incoming car by way of conventional signaling devices.

The rear ends of vehicles parked head in and at an angle toward a curb do not clearly and effectively notify a vehicle coming down a street toward the parked vehicles that a parked vehicle is backing out into the flow of traffic. One of the objects of this invention is to provide a definite means for positively notifying a vehicle coming down a line of traffic that a vehicle parked head-in along the right-hand curb is backing out into the line of traffic, such notification or signal preventing a crash and accident. Admittedly most automotive vehicles have backup lights which are automatically energized when a vehicle is placed in reverse gear, but such backup lights are only in the plane of the back end of the vehicle and shine along the rearward extension of the vehicle and are not visible from a point 30° or 45° to the longitudinal axis of such vehicle, because the lights are masked by the body of the vehicle. The present invention provides a rearwardly extendible signal light which extends rearwardly beyond the usual rear plane of a vehicle so that it is clearly visible to another vehicle approaching at an angle of, say 30° or more to the axis of the backing vehicle and is not masked by the body of the backing vehicle or its adjacently parked companion vehicle.

An object of this invention is to disclose and provide a novel means or signaling system for use on automotive vehicles whereby the prospective or occurring rearward motion of a vehicle is made known to oncoming vehicles whose direction of movement is at an incident angle of less than 90° to the rearward movement of the signaling vehicle, one distinguishing characteristic of the system being the controlled rearward extension of the signal. The movement and control of the signal may be by mechanical, manual, electrical, or pressure fluid means energized by the driver, these alternative means being within the skill or the art once the concept of this invention is recognized.

Other objects and advantages of this invention will become apparent to intelligent men from the following description of an operative embodiment of the invention and an example of the problem and its solution. For purposes of illustration and example, reference will be had to the appended drawings, wherein FIG. 1 is a plan view of a situation in which a recreational vehicle, desiring to move rearwardly from a parking stall in a parking lot is handicapped by inability to see an incoming vehicle and is therefore subject to collision damage.

FIG. 2 is a side elevation of an installation of means of this invention in the vehicle of FIG. 1.

FIG. 3 is a plan view of the means shown in FIG. 2.

FIG. 4 is an enlarged transverse section taken along plane IV—IV of FIG. 2.

FIG. 5 is a simplified wiring diagram of an exemplary means for controlling the operation of the means shown in the preceding figures.

FIG. 6 is a schematic representation of a modified form of drive for the carriage and its signal means.

As indicated hereinabove, this invention is applicable to various automotive vehicles, particularly campers, vans and motor homes, which, because of their width and length, do not permit their driver to see and be advised most effectively as to oncoming traffic. This invention ameliorates such handicaps.

A typical problem is illustrated in FIG. 1, wherein a camper vehicle 10 is shown parked adjacent a van or camper 9 and desires to back up into the aisle at his rear, but cannot see an incoming vehicle 8. In many instances 10 backs up, the reverse lights on 10's vehicle are not visible to 8, and 10 gets the impact of vehicle 8 without warning. 8 is not at fault since 8 could not see a signal on vehicle 10.

The present invention is directed to a rearwardly extendible signal which may be carried by the vehicle 10 on either its right, or preferably left, side (as in the area 10' of FIG. 1), and may be caused to extend or protrude rearwardly when the vehicle 10 intends to move rearwardly, so as to visibly and positively give notice to other (such as 8) that 10 is backing out. Even though 10 does not see 8, the burden is now on 8 to avoid hitting 10.

The rearwardly extendible signal means of this invention may be operated by electrical means, manually, or by pressure-fluid means. For purposes of illustration (and not as a limitation) reference will be had to FIGS. 2, 3, 4 and 5 which illustrate a simple motor-driven extendible signal pursuant to my concept.

As indicated in these figures, a longitudinal, virtually horizontal guide rail or track member 12 is supported by or and connected to the body, the lower surface of the floor, chassis, or a longeron frame member 14 of a vehicle such as a camper, by means of several brackets 13, with the rear end of the track 12 within the zone of protection of the rear bumper. The length of the track 12 should be somewhat more than twice the distance that the signal is to extend beyond the back of the vehicle when the signal is fully extended, this distance preferably ranging between about 18 – 24 inches to about 30 – 36 inches. Track 12 slidably supports and guides the extendible element or carriage 15, which in the form illustrated, resembles an inverted "T" in cross section, the head of such member having lips which are slidably embraced by upwardly and inwardly turned edge portions 16 of track 12. The upper edge of body 17 of element 15 is provided with a rack gear 18 cut into such edge, and arranged to mesh with a spur gear 19 rotated by a shaft of reversible motor 20 mounted in proximity to the carriage guide rail and a simple speed-reducing gear box 20'.

The rear end of extendible carriage element 15 is preferably provided with a suitably shaped red glass or plastic housing 22 for a signal light source supplied with power by insulated electrical conductors 23 extending rearwardly and suitably attached to element 15. This signal light housing 22 may be mounted upon an upstanding fin or support 24 attached to the body 17 of the element 15. In addition to the light housing 22, the illustrated exemplar carries an upstanding red reflector plate 25 capable of reflecting incident light as an easily visible lateral signal.

A simple circuit to controllably and selectively operate the extendible signal carriage means 15 is illustrated schematically in FIG. 5 and may include portions of the customary electrical circuitry of a motor-driven vehicle. The reversible motor 20 is shown with three terminal, current being selectively supplied to 1 to run the motor in a direction to project the signal, another 2 to run the motor in reverse to retract the signal and the third terminal being connected to ground or return line 29. Reversing switch S30 installed in the driver's compartment is a three-position switch, the horizontal dash line position illustrated being the null or inoperative position. When it is desired to extend the signal 22, the operator or driver moves the switch S30 to a 2 PM – 8 PM position and supplied current to line 31 and terminal 1. Moving switch S30 to a 4 PM – 10 PM position supplies current to line 32 and terminal 2 to reverse the motor and retract the signal to concealed position.

In the exemplary circuit of FIG. 5, line 31 includes a normally closed microswitch S1 which is only opened by a dog carried by the movable carriage signal 15 when it reached the outer limit of travel. Line 32 similarly includes normally closed micro-switch S2 which is opened by another dog on element 15 when the required concealed and retracted position of the signal is reached. These limit switches automatically stop the motor at outer and inner limits of travel.

The customary automobile circuitry may be utilized to supply electrical energy to and energize the light source 22 and "backup" indicators when the driver shifts into "reverse", these lights being automatically extinguished when the driver shifts into "forward" motion.

It may be mentioned that electric leads 23 to light source 22 may be carried upon a reel provided with a rewind spring, the movement into extended position unwinding the lead 23 against the spring and the spring winding the lead upon the reel when motor 20 retracts the moving assembly of 15, 22 and 25 into concealed position.

As previously indicated, means other than those illustrated in FIGS. 2, 3 and 4 may be employed in attaining the objectives of my invention. FIG. 6 diagrammatically illustrates a modification wherein the carriage 15' may be a slotted tube slidably mounted upon a fixed guide rail 12', which may be a cylindrical extrusion with a longitudinal attachment fin. A motor-driven spool 41, to which a flexible endless cable 40 is attached, provides motor means. At a suitable point, cable 40 is connected to a bracket, dog or other connecting means 43 on carriage 15', whereby by selective operation of control means of the character described in connection with FIG. 5, the carriage 15' and its signal means 22 and 25 may be caused to move from a concealed position to a readily visible position 2 to 3 feet beyond the back of the vehicle. Concealed positions below the floor are readily accessible and effective, but some vehicle bodies readily permit concealed installation above floor level. These variations, including fluid pressure means, telescoping carriages, and even lazy tong linkages, with or without limit stop switches such as S1 and S2 of FIG. 5, can be employed within the general concept of my invention.

From the above specification, the construction, purpose and operation of my invention is clearly evident. It has been successfully employed in preventing unnecessary crashes and damages, and gives the operator a sense of security which was missing heretofore. It is to be noted that the control means is preferably independent of the customary backup lights, which are automatically energized when an operator shifts into reverse, the preferred arrangement preventing accidental rearward projection of the signal means into a vehicle parked in back of the equipped vehicle.

That portion or part of the back of the vehicle through which the signal carriage extends when in projecting position may be normally closed by a hinged obturating element lightly spring-biased into closed position and capable of being pushed into open position by the signal means similar to the well-known, spring-biased, in-out arrangement for household cats and small dogs. In order to make certain that the signal does not remain in extended position after the vehicle has completed its rearward movement, the activating circuit may include a buzzer or flashing light in the driving compartment to remind the operator that the signal is extended, such reminding circuit being disconnected whn switch S30 is placed in position to retract the signal.

I claim:

1. In combination with an automotive vehicle, having a front driving compartment and a rear, enclosed body portion terminating in a back, the provision of:
    carriage means extending longitudinally of the vehicle in a normally concealed position, said carriage including light-reflective signal means;
    means for moving said carriage longitudinally from a concealed position wherein the signal means is concealed to a visible position about 18 inches to about 30 inches beyond the back of the vehicle.
    and means for selectively controlling the movement of said carriage from the driving compartment.

2. A combination as stated in claim 1, wherein the means for moving the carriage includes a reversible electric motor and a driving connection between the motor and the carriage.

3. A combination as stated in claim 2, wherein the selective control means include a manually operable motor-energizing means and automatic, carriage-actuated switch means for interrupting the motor-energizing means when said carriage reaches the predetermined visible position.

4. A combination as stated in claim 2, including a port in the back of the enclosed body portion of the vehicle, said port being in the line of movement of said carriage, a rearwardly opening closure member for said port, said closure member being spring-biased toward closed position but adapted to yield to outward movement of the carriage.

5. In combination with an automotive vehicle having a frame, a floor, a driving compartment and a back portion, the provision of:
    a longitudinally extending guide rail attached to the frame beneath the floor; a carriage slidably mounted on the guide rail, said carriage including light-reflecting and light-emitting signal means;
    motor means including a driving connection with said carriage for moving the carriage rearwardly from a concealed position of the signal means to a visible position where the signal means are between about 18 inches to about 30 inches beyond the back of the vehicle;

and means for selectively controlling the motor means and movement of said carriage and signal means into and out of said rearwardly extending visible position.

6. An extendible signaling system adapted for installation and use on an automotive vehicle having a forward driving compartment and a body portion having a back, said system including a guide rail adapted to be attached in a longitudinally extending and normally concealed position on a vehicle;

a carriage slidably mounted on the guide rail;

a vertical fin carried by the rearward end of said carriage, said fin being provided with laterally reflective signal means and a signal means provided with a light source;

a reversible motor means adapted to be mounted in proximity to said guide rail and carriage;

a driving connection between said motor and carriage for moving the carriage rearwardly from a concealed position on a vehicle to a visible position between 18 inches and about 30 inches beyond the back of the vehicle;

and switch means for installation in the driving compartment of the vehicle for selectively controlling the motor and movement of the carriage and its signal means.

* * * * *